United States Patent [19]
Roebelen, Jr. et al.

[11] Patent Number: 5,115,859
[45] Date of Patent: May 26, 1992

[54] REGENERABLE NON-VENTING COOLER FOR PROTECTIVE SUIT

[75] Inventors: George J. Roebelen, Jr.; Stephen A. Bayes, both of Suffield, Conn.

[73] Assignee: United Technologies Corporation, Hartford, Conn.

[21] Appl. No.: 633,570

[22] Filed: Dec. 21, 1990

[51] Int. Cl.⁵ .................. F28D 20/00; F25B 21/02
[52] U.S. Cl. .................. 165/10; 165/104.11; 165/101; 62/259.3; 62/3.62; 62/3.7
[58] Field of Search .............. 165/10, 104.11, 101, 165/103; 62/430, 3.5, 3.62, 3.7, 259.3, 3.2

[56] References Cited
U.S. PATENT DOCUMENTS

| | | | |
|---|---|---|---|
| 2,191,198 | 2/1940 | Gould | 62/430 |
| 3,085,405 | 4/1963 | Frantti | 62/3 |
| 3,154,926 | 11/1964 | Hirschhorn | 62/3 |
| 3,156,101 | 11/1964 | McGuffy | 62/430 |
| 4,127,161 | 11/1978 | Clyne et al. | 165/104.11 |
| 4,291,750 | 9/1981 | Clyne et al. | 165/104.11 |
| 4,405,348 | 9/1983 | Pasternack | 62/259.3 |
| 4,459,822 | 7/1984 | Pasternack | 62/259.3 |

FOREIGN PATENT DOCUMENTS 1126426 3/1962 Fed. Rep. of Germany.

OTHER PUBLICATIONS

Ser. No. 07/593,599 Filed Oct. 4, 1990. Space Suit Cooling Apparatus. Applicants: Stephen A. Bayes and George J. Roebelen, Jr.

Primary Examiner—Albert W. Davis, Jr.
Attorney, Agent, or Firm—William W. Habelt

[57] ABSTRACT

A life support back pack 14 for use during extravehicular activity in space incorporates a cooling apparatus 20 comprised of five panels 22 each of which include in layered fashion a LCG coolant heat exchange coil 32, a heat distribution plate 42, and a heat dissipation module 50A or 50B having an outer radiator surface 52. Each module 50A houses a first phase change material 55A, for example hexadecane paraffin, and each module 50B houses a second phase change material 55B, for example tetradecane paraffin, which has a phase change temperature which is less than the phase change temperature of the first phase change material 55A. The cooling apparatus 20 is equipped with a coolant heat exchange circuit provided with mode selection valves 84 and 86 which are operated by a controller 88 to selectively direct the LCG coolant to be cooled through the cooling apparatus in one of three operating modes.

19 Claims, 3 Drawing Sheets fig. 3
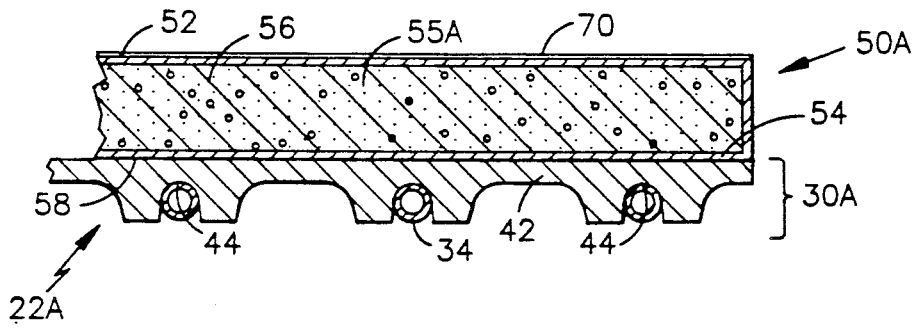
fig. 4
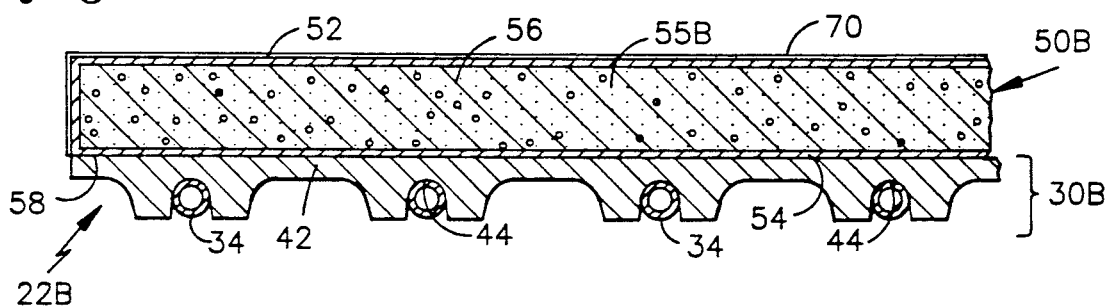
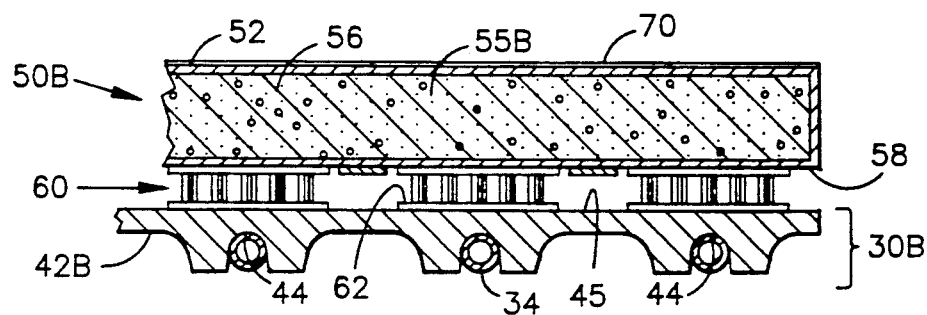
fig. 5

REGENERABLE NON-VENTING COOLER FOR PROTECTIVE SUIT

GOVERNMENT RIGHTS

The invention described herein was made in the performance of work under NASA Contract No. NAS9-17301 and is subject to the provisions of Section 305 of the National Aeronautics and Space Act of 1958 (42 U.S.C. 2457).

TECHNICAL FIELD

This invention relates generally to an apparatus for cooling a liquid for use in cooling the interior of a protective suit and, more particularly, to a cooler pack adapted to be worn during extravehicular activity in space for cooling a coolant used for removing heat from within a space suit.

BACKGROUND ART

It is well appreciated in the art that the interior of a sealed protective suit, such as a sealed space suit, must be cooled so as to prevent excessive heat buildup and maintain a comfortable temperature within the suit for the benefit of the occupant. Without adequate cooling of the interior, the environment within the suit would become unsuitable as heat generated within the suit, largely due to the occupant's metabolism, and heat energy transferred from the external environment build up.

Accordingly, it is customary for the occupant of such a protective suit to wear under the suit a garment which is liquid cooled to remove metabolic heat rather than allowing it to build up within the interior of the suit. Typically, the liquid cooled garment (LCG) includes a plurality of flexible tubes forming a cooling network about the occupant's body through which a suitable coolant, generally water, is pumped as a heat sink fluid. Such liquid cooled garments are disclosed for example in U.S. Pat. Nos. 3,289,748, 3,295,594 and 3,400,756. As the coolant traverses the tubular network, the coolant absorbs heat thereby increasing its temperature. After completing its traverse of the network of cooling tubes in the LCG, the coolant is collected for recycle. Before the coolant is suitable for recycle, the heat picked up in traversing the tubular network of the LCG must be removed.

One technique for removing this heat involves passing the coolant in heat exchange relationship with a heat sink containing a phase change material which will absorb heat from the coolant and in the process will undergo an endothermic phase change. Thus, not merely the heat capacity of the material, but more importantly the heat of fusion of the material provide the heat sink. At least a portion of the heat absorbed by the heat sink is transferred therefrom to the surrounding exterior environment. After a period of time, the heat sink must be regenerated by cooling the phase change material to reverse its phase change thereby bringing the material back to its original state and preferably to also subcool the material.

An apparatus adapted to cool a coolant for a protective suit by this technique, and particularly suited to be worn as a backpack by an occupant of a sealed space suit during extravehicular activity, is presented in commonly assigned, co-pending application Ser. No. 593,599 filed Oct. 4, 1990, as a continuation of application Ser. No. 325,426, filed Mar. 20, 1989. The apparatus disclosed therein for cooling the coolant from a liquid cooled garment comprises a radiator-based, non-venting cooling system utilizing a single phase change material stored in a plurality of panels which form the exterior of the backpack worn during extravehicular activity. Each panel is formed of layered components comprising, from the interior (i.e. nearest the occupant) to the exterior (i.e. exposed to the environment): a layer of coolant circulation tubes disposed against the interior facing surface of a heat distribution plate, a plurality of thermoelectric heat pump modules distributed over the exterior facing surface of the heat distribution plate, a heat storage panel disposed on the array of heat pump modules and containing the phase change material, and a coating on the exterior surface of the heat storage panel for enhancing radiation of heat therefrom to a vacuum environment. The phase change material is defined as being any material which changes phase from about 40° F. to 65° F., with a paraffin based substance or mixture, preferably n-hexadecane paraffin, being the desired phase change material since it has a phase change temperature which lies near the average between the highest and lowest LCG coolant temperatures typically required during extravehicular activity in space. Although well suited for use as a portable cooling system, the attractiveness of such an apparatus would be enhanced if the volume occupied by the layered components could be reduced and if the number of thermoelectric heat pump modules required could be reduced thereby simplifying the complex wiring network associated therewith and reducing electric current and power usage.

Accordingly, it is an object of the present invention to provide a lower volume, lower power consuming, non-venting cooling apparatus for transferring heat from a liquid cooled garment coolant to a surrounding environment.

It is a further object of the present invention to provide a regenerable, non-venting cooling apparatus utilizing two different phase change materials as heat sinks for transferring heat from a liquid cooled garment coolant of a space suit to a surrounding vacuum environment during extravehicular activity.

DISCLOSURE OF THE INVENTION

A non-venting cooling apparatus is provided for transferring heat from a coolant fluid of a liquid cooled garment of a protective suit to a surrounding environment, thereby cooling the coolant fluid from a first temperature at which the coolant fluid is received to a lower second temperature at which the coolant fluid is discharged.

The apparatus comprises: first and second heat dissipation means for absorbing heat from the coolant fluid; coolant heat exchange means for passing the coolant in heat exchange relationship with the first and second heat dissipation means; circulation control means operatively associated with the coolant heat exchange means for selectively directing the coolant fluid to pass through the coolant heat exchange means; and radiator means operatively associated with the first and second heat dissipation means for transferring heat therefrom to the surrounding environment.

In accordance with the present invention, the first heat dissipation means encloses a first phase change material and the second heat dissipation means encloses a second phase change material which has a phase change temperature which is lower than the phase change temperature of the first phase change material. Advantageously, the first phase change material is selected to provide a phase change temperature which is lower than the required LCG coolant supply temperature for a significant portion of a typical extravehicular excursion but high enough to radiate away a significant quantity of heat, while the second phase change material is selected to provide a phase change temperature which is below the minimum temperature at which the coolant is to be returned to the LCG, but above the freezing point of the coolant itself. Most advantageously, the first phase change material comprises hexadecane paraffin and the second phase change material comprises tetradecane paraffin.

Further, the coolant heat exchange means has a first portion operatively associated in heat exchange relationship with said first heat dissipation means and a second portion operatively associated in heat exchange relationship with said second heat dissipation means. The circulation control means operatively associated with the coolant heat exchange means serves to selectively direct the coolant fluid to pass through either solely the first portion of the coolant heat exchange means, or solely the second portion of the coolant heat exchange means, or in series through the first portion and thence through the second portion of the coolant heat exchange means, depending upon the temperature desired for the cooled coolant to be circulated back to the liquid cooled garment and the quantity of heat required to be removed therefrom.

BRIEF DESCRIPTION OF DRAWING

The aforementioned and other objects, features and advantages of the present invention will become more apparent in light of the detailed description of a best mode embodiment thereof, as illustrated in the accompanying drawing, wherein:

FIG. 3 is an enlarged cross-sectional view of the side panel 22A of FIG. 1;

FIG. 4 is an enlarged cross-sectional view of the back panel 22B of FIG. 1;

FIG. 5 is an enlarged cross-sectional view of an alternate embodiment of the panel illustrated in FIG. 4.

BEST MODE FOR CARRYING OUT THE INVENTION

Figure 1:
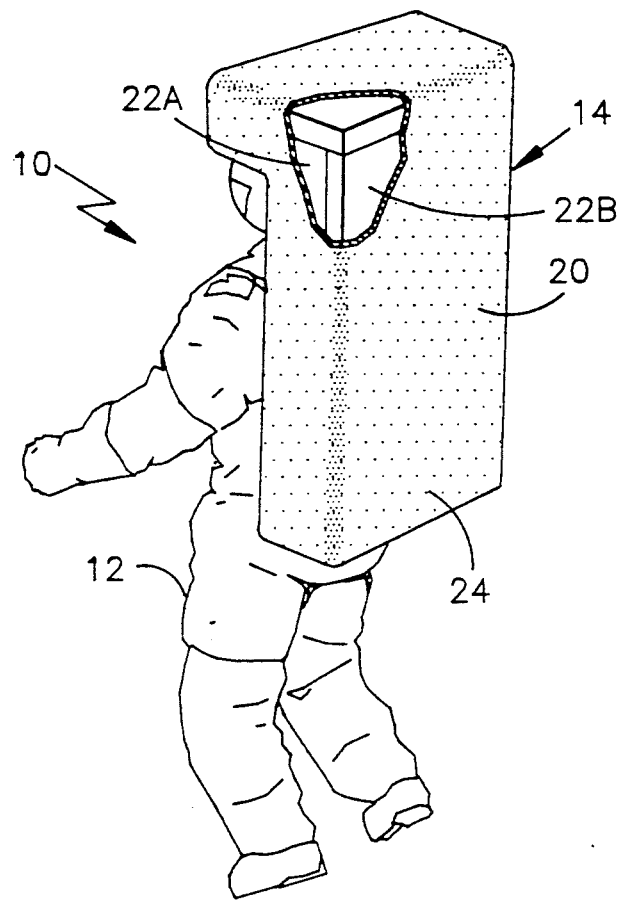
FIG. 1 is a perspective view, partly in section, of the apparatus of the present invention in use with an extravehicular activity space suit.
Figure 2:
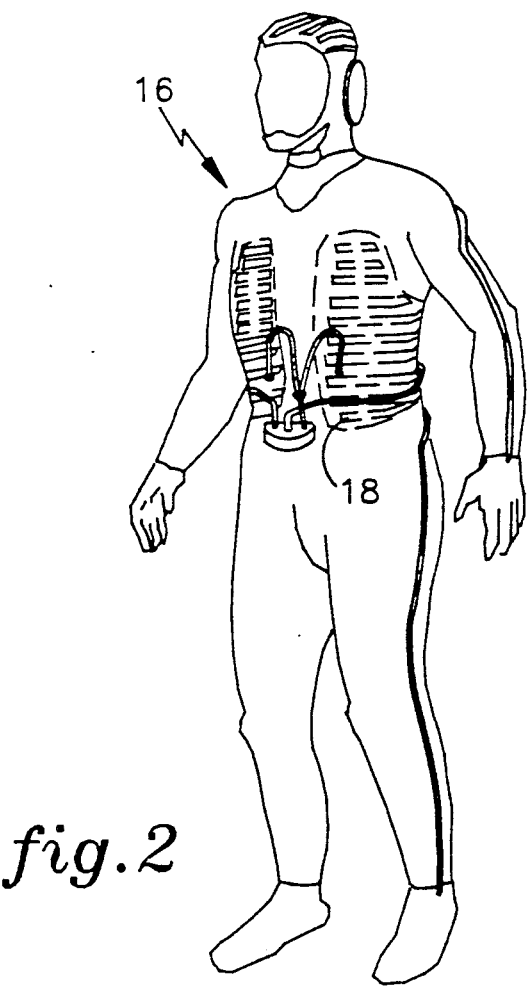
FIG. 2 is a perspective view of a conventional liquid cooled garment worn beneath an extravehicular activity space suit of type depicted in FIG. 1.

Referring now to FIG. 1 and 2, there is depicted therein an astronaut 10 wearing a protective extravehicular activity space suit 12 equipped with a life support back pack 14 which incorporates the cooling apparatus 20 of the present invention. Worn beneath the protective space suit 12 is a conventional liquid cooled garment 16 of the type well known in the art. The LCG includes a network 18 of flexible coolant tubes mounted on a fabric net in such a manner as to efficiently cool the body of the wearer and absorb heat generated by the wearer's metabolism.

In operation, a cooling fluid, conventionally water, is supplied to the LCG network at a relatively low temperature, typically in the range from about 53° F. to about 75° F., and circulated therethrough as a heat sink fluid to absorb metabolic heat thereby cooling the wearer and the interior of the suit 12. In the process, the temperature of the LCG coolant increases, typically, to a temperature in the range of about 64° F. to 78° F. After having traversed the LCG network, the coolant is collected and passed through the cooling apparatus 20 of the present invention housed in the life support pack 14 to remove the heat absorbed by the coolant and return the coolant to the desired temperature for recirculating the coolant through the LCG network.

The cooling apparatus 20 comprises: a first heat dissipation means for absorbing heat from the LCG coolant and made up of a first portion 50A of the heat dissipation modules; a second heat dissipation means for absorbing heat from the LCG coolant and made up of a second portion 50B of the heat dissipation modules; coolant heat exchange means having a first portion 30A through which coolant may be passed in heat exchange relationship with the first heat dissipation means 50A and a second portion 30B through which coolant may be passed in heat exchange relationship with the second heat dissipation means 50B, circulation control means 80 operatively associated with the coolant heat exchange means for selectively directing the coolant fluid to pass through at least one of the first and second portions 30A, 30B of the coolant heat exchange means.

The five panels 22, which are assembled to form the top, bottom, back and sides of the exterior layer of the life support pack 14, collectively and in combination with circulation control means 80 form the cooling apparatus 20 of the present invention. As best illustrated in FIGS. 3 and 4, each of the panels 22 of the non-venting cooling apparatus 20 includes in layered fashion, from the inside (i.e. nearest to the occupant) to the outside (i.e. nearest to the exterior environment), the following components: coolant heat exchange means comprising a coolant heat exchange coil 34 and a heat distribution plate 42 associated therewith, and a heat dissipation means comprising a heat dissipation module 50A or 50B having an exterior surface 52, i.e. the surface oriented towards the surrounding environment, which functions to transfer heat away from the heat dissipation module 50 by radiating to the surrounding vacuum environment.

To enhance transfer of the heat absorbed by the heat dissipation modules 50 to the surrounding environment, the exterior surface 52 of each module, which in assembly forms an outer radiator surface 24 about the exterior of the life support back pack 14, is provided with a radiation enhancing coating to improve radiative heat transfer to the surrounding environment. For use in space, where the surrounding environment is a vacuum, the coating 70 advantageously comprises a layer disposed on the exterior surface of each module 50 of a material which has a low solar absorptivity and a high infrared emissivity. Most advantageously, the radiation coating comprises a layer adhesively bonded to the exterior surface of the modules of Teflon tape which has an inner coating of vacuum deposited silver.

Each heat exchange coil 34 of the coolant heat exchange means 30A and 30C comprises a plurality of coiled or looped tubes, preferably made of a high strength, corrosion resistant, thermally conductive material, such as stainless steel, mounted to a heat distribution plate 42, generally being bonded to the plate with a thermally conductive material, such as thermally conductive RTV rubber. Each heat exchange loop or coil has an inlet for receiving the heated LCG coolant returning from the cooling network of the liquid cooled garment, an outlet for discharging the cooled LCG coolant for recycle to the liquid cooled garment, and flow conduits therebetween through which the LCG coolant passes in heat exchange relationship with the plate 42 to which it is mounted. The heat distribution plates 42 are constructed of a relatively light weight, thermally conductive material, such as aluminum, and serve to conduct the heat from the LCG coolant flowing through the heat exchange tubes 34 to, and distribute that heat relatively evenly over, the heat dissipation modules 50. Each heat distribution plate 42 has a network of grooves 44 provided in one face thereof, the grooves 44 being adapted to receive the heat exchange tubes 34 therein. The other face of each heat distribution plate 42 is disposed in contact with a heat dissipation module 50 so as to facilitate heat transfer by conduction through the plate from the LCG coolant passing through the heat exchange tubes 34 mounted to one side of the plate to the heat dissipation module 50 contacting the other side of the plate.

Each heat dissipation module 50A or 50B comprises a housing 54 enclosing and retaining a phase change material 55 interspersed within a heat distribution matrix 56. The housing 54 is constructed of a light weight, thermally conductive material such as aluminum so as to facilitate heat transfer to the phase change material 55 and to the exterior radiating surface 52 thereof. The heat distribution matrix 56 disposed within the housing 54 serves to facilitate distribution of heat from the housing 54 relatively evenly throughout the phase change material 55 as well as between the interior-facing surface 58 and the exterior-facing surface 52 of the housing 54. The heat distribution matrix is also constructed of a light weight, thermally conductive material such as aluminum, in particular foamed aluminum.

In accordance with the present invention, each heat dissipation module 50A encloses a first phase change material 55A which has a phase change temperature at which the material will change state upon absorbing further heat, i.e. from a solid state to a liquid state, while each heat dissipation module 50B encloses a second phase change material 55B which has a phase change temperature at which the material will change state upon absorbing further heat, i.e. from a solid state to a liquid, which is lower than the phase change temperature of the first phase change material 55A.

Referring now to FIG. 5, there is depicted an alternate embodiment of the second heat dissipation module 50B enclosing the lower phase change temperature material 55B. In this embodiment, heat pump means 60 is operatively disposed intermediate of the coolant heat exchange means 30B and the heat dissipation modules 50B to facilitate and regulate the transfer of heat from the cooling tubes through the coolant heat exchange means into the heat dissipation modules 50B. As disclosed in the aforementioned commonly assigned application Ser. No. 593,599, the entire disclosure of which is hereby incorporated by reference, the heat pump means 60 advantageously comprises an array of electrically connected thermoelectric modules 62 distributed over the outer surface 45 of the heat distribution plate 42B, that is over the surface of the plate juxtaposed adjacent the heat dissipation module 50B enclosing the lower temperature phase change material 55B. By varying the voltage across the array, the normal conductive heat transfer rate from the heat distribution plate 42B to the heat dissipation module 50B may be selectively increased or decreased as desired. If a voltage is not applied across the array, the thermoelectric modules 62 still provide a conductive path for heat transfer between the heat distribution plate 42B and the heat dissipation module 50B.

As noted hereinbefore, in accordance with the present invention, the phase change material 55B enclosed in a heat dissipation module 50B is selected to have a phase change temperature which is lower than the phase change temperature of the phase change material 55A enclosed in a heat dissipation module 50A. Advantageously, the phase change materials are selected such that the material 55A enclosed in the heat dissipation modules 50A has a phase change temperature which is lower than the required LCG coolant supply temperature for a significant portion of a typical extravehicular excursion yet high enough to radiate a significant quantity of heat in a typical space environment, and the material 55B enclosed in the heat dissipation modules 50B has a phase change temperature which is below the minimum temperature at which the coolant is to be returned to the LCG, but above the freezing point of the coolant. In space applications, it is advantageous for the phase change material 55A should be a material having a phase change temperature within the range of about 55° F. to about 65° F., such as hexadecane paraffin which has a melting point of about 64° F., while the phase change material 55B should be a material having a phase change temperature less than about 50° F., and preferably in the range between 39° F. and 48° F., such as tetradecane paraffin which has a melting point of about 42° F.

An important feature of this type of cooling apparatus is that the heat absorption capacity of the heat dissipation modules 50 may be readily restored for reuse following a heat absorption operation which resulted in partial or complete melting of the phase change material 55. To regenerate the heat absorption capacity after use, a cold fluid, i.e. a fluid having a temperature below the phase change temperature of the particular phase change material housed in the modules, is passed through the heat exchange coils 32 in heat exchange relationship with the liquid material 55 so as to cool the material back to its original solid phase. For example, in space applications wherein hexadecane paraffin and tetradecane paraffin are the selected phase change materials, when the extravehicular activity is completed and the astronauts returned to their craft, the cooling capacity of the modules 50 is restored by pumping cooled water at a temperature of 40° F. or less through the heat exchange coils 32 to cool and resolidify the paraffin. The cooling capacity of the modules may be advantageously augmented by subcooling the phase change material during regeneration to a temperature below its phase change temperature, for example to a temperature of about 50° F. for hexadecane paraffin and to about 35° F. for tetradecane paraffin.

The cooling apparatus of the present invention is provided with circulation control means 80 which may be operated to selectively direct the LCG coolant discharged from the LCG cooling network for cooling either through the modules 50A of the first heat dissipation means only, or through the modules 50B of the second heat dissipation means only, or in series through both the first and second heat dissipation means, first through the modules 50A and thence through the modules 50B. In operational mode 1, when the return temperature (i.e. entering valve 82) of the coolant discharged from the LCG cooling network is above the phase change temperature of the first phase change material 55A and the desired recycle temperature at which the coolant is to be recirculated to the LCG cooling network is above the phase change temperature of the first phase change material 55A, the circulation control means 80 directs the flow of the LCG coolant such that the coolant passes through only the first heat dissipation means 50A and bypasses the second heat dissipation means 50B, unless the cooling capacity of the first heat dissipation means 50A is insufficient to cool the coolant to the desired recycle temperature.

In operational mode 2, when the return temperature of the coolant discharged from the LCG cooling network is above the phase change temperature of the first phase change material 55A but the desired recycle temperature at which the coolant is to be recirculated to the LCG cooling network is below the phase change temperature of the first phase change material 55A, the circulation control means 80 directs the flow of the LCG coolant such that the coolant passes first through the first heat dissipation means 50A and thence through the second heat dissipation means 50B. This operational mode is also used when the cooling capacity of the first heat dissipation means 50A alone is insufficient to cool the coolant to the desired recycle temperature even though the desired recycle temperature at which the LCG coolant is to be recirculated is above the phase change temperature of the first phase change material 55A.

In operational mode 3, when the return temperature of the coolant discharged from the LCG cooling network is below the phase change temperature of the first phase change material 55A (operational mode 3), the circulation control means 80 directs the flow of the LCG coolant such that the coolant passes through only the second heat dissipation means 50B and bypasses the first heat dissipation means 50A. In operational mode 2 or mode 3, if the heat dissipation module 50B is provided with a heat pump 60, the heat pump 60 may be activated and the voltage thereto modulated to selectively augment heat transfer from the LCG coolant to the phase change material 55B in the module 50B when necessary in order to adequately cool the coolant to the desired recycle temperature.

Figure 6:
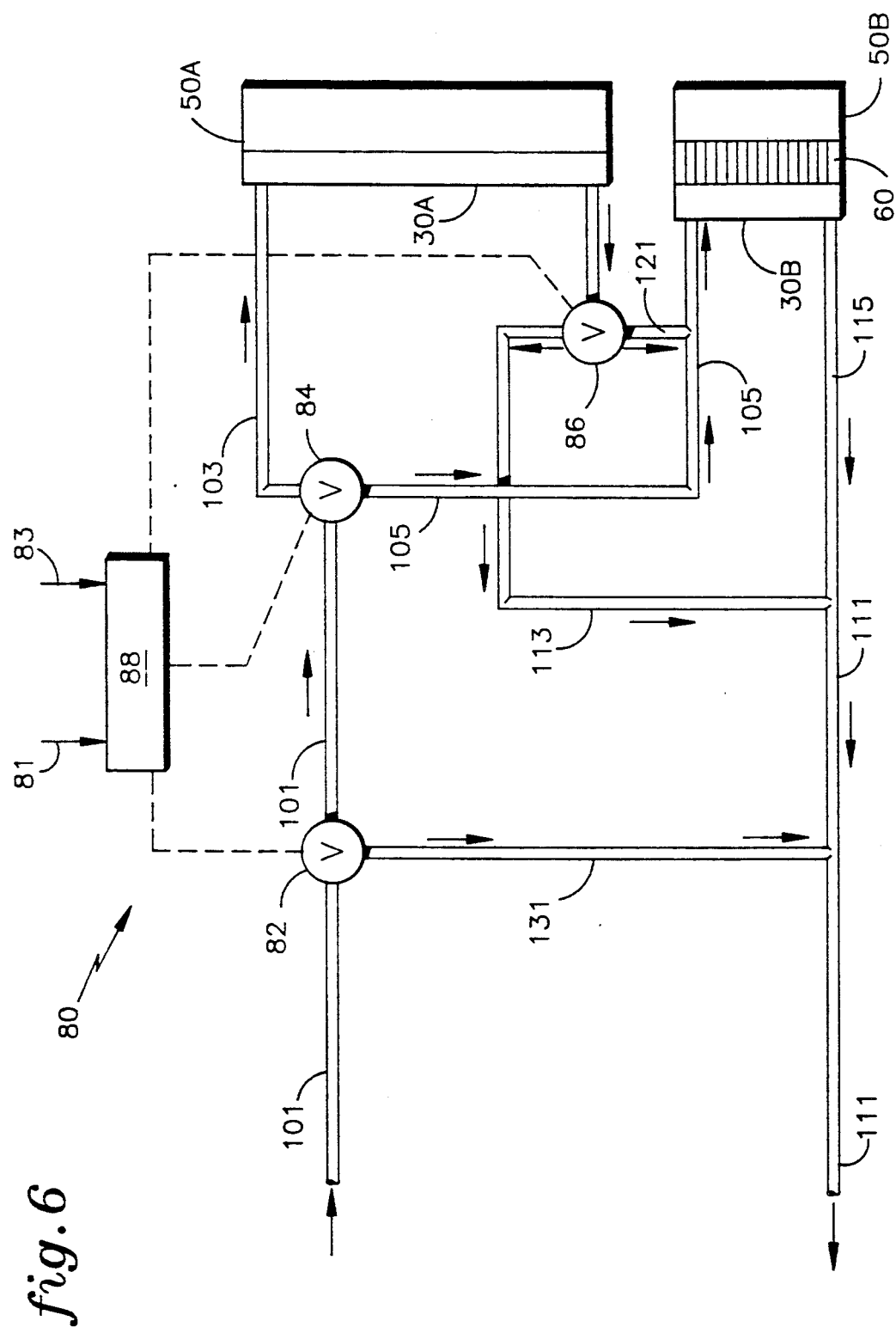
FIG. 6 is a schematic of the cooling apparatus of the present invention.

As schematically illustrated in FIG. 6, the coolant circulation means 80 operatively associated with the coolant heat exchange means 30 includes bypass valve 82, mode selection valves 84 and 86, a circulation controller 88 for controlling the operation of valves 82, 84, 86 to selectively direct the LCG coolant to be cooled through the various conduits making up the heat exchange circuit such that the cooling operation is carried in one of the aforementioned modes. The heat exchange circuit collectively comprises the following conduits:

a. first supply conduit 101 for directing the coolant fluid to be cooled to the coolant heat exchange means 30A and/or 30B;

b. second supply conduit 103 for directing the coolant fluid to be cooled from the first conduit 101 directly to the inlet of the first heat exchange means 30A;

c. third supply conduit 105 for directing the coolant fluid to be cooled from the first conduit 101 directly to the inlet of the second heat exchange means 30B;

d. first discharge conduit 111 for directing the cooled coolant fluid from the coolant heat exchange means 30;

e. second discharge conduit 113 for directing the cooled coolant fluid from the outlet of the first heat exchange means 30A to the first discharge conduit 111;

f. third discharge conduit 115 for directing the cooled coolant fluid from the outlet of the second heat exchange means 30B to the first discharge conduit 111;

g. connector conduit 121 for directing cooled coolant from the outlet of the first heat exchange means 30A to the inlet of the second heat exchange means 30B; and h. bypass conduit 131 for directing the coolant fluid directly from the first supply conduit 101 to the first discharge conduit 111 whereby the coolant fluid passing through the bypass conduit 131 bypasses both the first and the second heat exchange means 30A and 30B.

In operation, the circulation controller 88 receives a signal 81 indicative of the measured return temperature of the coolant discharged from the LCG cooling network, which is measured as the coolant passes through the first supply conduit 101 at a point upstream of the bypass valve 82, and compares the received signal to a first set point value indicative of the phase change temperature of the first phase change material 55A and a second set point value indicative of the desired recycle temperature at which the coolant is to be recirculated to the LCG cooling network. If the measured return temperature of the coolant discharged from the LCG cooling network is above the phase change temperature of the first phase change material 55A and the desired recycle temperature at which the coolant is to be recirculated to the LCG cooling network is also above the phase change temperature of the first phase change material 55A, the circulation controller 88 sends the appropriate control signal to the first mode selection valve 84 to operate to open to the second supply conduit 103 and close the third supply conduit 105 and the appropriate control signal to the second mode selection valve 86 to open to the second discharge conduit 113 and close the connector conduit 121. The flow of the LCG coolant is thereby directed in accord with mode 1 such that the coolant passes through only the first heat dissipation means 50A and bypasses the second heat dissipation means 50B.

The circulation controller 88 also receives a signal 83 indicative of the measured recycle temperature at which the cooled coolant is being recirculated back to the LCG cooling network, which temperature is measured as the cooled coolant is passing through the first discharge conduit 111 at a location downstream of the junction of the bypass conduit 131 with the first discharge conduit 111. If while operating in mode 1, the measured recycle temperature rises above the desired recycle temperature, which will occur if the cooling capacity of the first heat dissipation means 50A is insufficient to cool the coolant to the desired recycle temperature, the controller 88 will send a signal to the second mode selection valve 86 to open to the connector conduit 121 and close the second discharge conduit 113. The flow of the LCG coolant is thereby directed in accord with mode 2 such that the coolant passes in series first through the first heat dissipation means 50A and thence through the second heat dissipation means 50B.

If the signal 81 indicative of the measured return temperature of the coolant discharged from the LCG cooling network is above the set point value indicative of the phase change temperature of the first phase change material 55A, but the desired recycle temperature at which the coolant is to be recirculated to the LCG cooling network is below the set point value indicative of the phase change temperature of the first phase change material 55A, the circulation controller 88 sends the appropriate control signal to the first mode selection valve 84 to operate to open to the second supply conduit 103 and close the third supply conduit 105 and the appropriate control signal to the second mode selection valve 86 to open to the connector conduit 121 and close the second discharge conduit 113. The flow of the LCG coolant is thereby directed in accord with mode 2 such that the coolant passes in series first through the first heat dissipation means 50A and thence through the second heat dissipation means 50B.

If the signal 81 indicative of the return temperature of the coolant discharged from the LCG cooling network is below the set point value indicative of the phase change temperature of the first phase change material 55A, the circulation controller 88 sends a signal to the first mode selection valve 84 to open to the second supply conduit 105 and close the first supply conduit 103. The flow of the LCG coolant is thereby directed in accord with mode 3 such that the coolant passes through only the second heat dissipation means 50B and bypasses the first heat dissipation means 50A.

If the heat dissipation module 50B is provided with a heat pump 60 as illustrated in FIG. 5, the heat pump 60 may be activated and the voltage to the thermoelectric modules thereof modulated to selectively augment heat transfer from the LCG coolant to the phase change material 55B in the module 50B by the controller 88 when operating in mode 2 or mode 3, whenever the controller 88 senses that signal 83 indicative of the measured recycle temperature rises above the set point value indicative of the desired recycle temperature, thereby increasing the heat transfer from the coolant to the second phase change material as necessary in order to adequately cool the coolant to the desired recycle temperature.

The circulation controller 88 also operates to selectively control the flow of coolant from the first supply conduit 101 by way of the bypass valve 82 through the bypass conduit 131 into the first discharge conduit 111. If the signal 83 indicative of the measured recycle temperature drops below the set value indicative of the desired recycle temperature, the controller 88 sends the appropriate signal to the bypass valve 82 to selectively open to the bypass conduit 131 whereby a controlled portion of the coolant passing through the first supply conduit 101 is diverted into the first discharge conduit 111 through the bypass conduit 131. Thus, the admixed coolant flow is discharged through the downstream portion of the first discharge conduit 111 for recirculating to the cooling network of the liquid cooled garment at an admixture temperature which is equal to the desired recycle temperature.

By providing a cooling apparatus which uses two distinct phase change materials 55A and 55B housed in separate heat dissipation modules 50A and 50B, which phase change materials have substantially different phase change temperatures, the required cooling volume provided by the heat dissipation modules is synergistically reduced relative to the required cooling volume for the same workload of a cooling apparatus employing solely one of the distinct phase change materials in all modules or a cooling apparatus employing an admixture of the distinct phase change materials in each of its modules. A phase change material which has a relatively high phase change temperature gives improved radiation cooling thereby ensuring adequate rejection of heat to the surrounding environment, but may not provide adequate cooling of the coolant under heavy load conditions. A phase change material which has relatively low phase change temperature ensures adequate cooling of the coolant, but will exhibit lower radiation cooling ability and therefore inferior transfer of heat to the surrounding environment. By utilizing two distinct phase change materials 55A and 55B housed in separate heat dissipation modules 50A and 50B, one having a relatively high phase change temperature and the other having a relatively low phase change temperature, adequate cooling capability and adequate heat rejection ability can be provided in a minimum volume.

In space applications, the optimum split between module types which results in minimum overall module volume and little or no power consumption by thermoelectric modules generally is with the modules 50B housing the lower phase change temperature material 55B providing about 20% to about 30% of the total cooling capacity provided by the modules 50. The exact point at which the heat pump means may be eliminated varies depending upon the minimum temperature required for the coolant being supplied to the LCG in the application which, in turn, generally depends upon the maximum metabolic rate to be achieved.

In any case, in the cooling apparatus of the present invention, heat pump means when needed are advantageously associated with the cooling panels incorporating the lower phase change temperature material. Also, if thermoelectric modules are required at all, the attendant wiring to operate them is much less complex than characteristically encountered in comparable prior art cooling apparatus due to the reduced size and simpler geometric configuration of the surface area corresponding to the heat dissipation modules 50B to which they are affixed.

Although the invention has been shown and described with respect to a best mode embodiment thereof, it should be understood by those skilled in the art that changes, omissions, and additions in the form and detail thereof may be made therein without departing from the spirit and scope of the invention.

We claim:

1. A non-venting cooling apparatus for transferring heat from a coolant fluid to a surrounding environment to cool the coolant fluid from a first temperature at which the coolant fluid is received to a second temperature at which the coolant fluid is discharged for recycle, said apparatus comprising:
   a. a first heat dissipation means absorbing heat from the coolant fluid, said first heat dissipation means enclosing a first phase change material;
   b. a second heat dissipation means for absorbing heat from the coolant fluid, said second heat dissipation means enclosing a second phase change material, the phase change temperature of the second phase change material being lower than the phase change temperature of the first phase change material;
   c. coolant heat exchange means for passing the coolant in heat exchange relationship with said first and second heat dissipation means, said coolant heat exchange means having a first portion operatively associated in heat exchange relationship with said first heat dissipation means and a second portion operatively associated in heat exchange relationship with said second heat dissipation means;
d. circulation control means operatively associated with said coolant heat exchange means for selectively directing the coolant fluid to pass through at least one of the first and second portions of said coolant heat exchange means; and
e. radiator means operatively associated with said first and second heat dissipation means for transferring heat from said first and second phase changes materials to the surrounding environment.

2. Apparatus as recited in claim 1 wherein the first phase change material consists essentially of hexadecane paraffin.

3. Apparatus as recited in claim 2 wherein the second phase change material consists essentially of tetradecane paraffin.

4. Apparatus as recited in claim 1 wherein the phase change temperature of the first phase change material is generally lower than the value of said second temperature and the phase change temperature of the second phase change material is lower than the minimum value of said second temperature.

5. Apparatus as recited in claim 1 wherein the phase change temperature of the first phase change material is between about 55° to about 65° F. and the phase change temperature of the second phase change material is less than about 50° F.

6. Apparatus as recited in claim 5 wherein the phase change temperature of the second phase change material is between about 39° to about 48° F.

7. Apparatus as recited in claim 1 wherein said coolant heat exchange means for passing the coolant in heat exchange relationship with said first and second heat dissipation means comprises a first heat exchange coil having an inlet and an outlet and a flow conduit therebetween; a second heat exchange coil having an inlet and an outlet and a flow conduit therebetween; a first plate disposed in heat transfer relationship between said first heat exchange coil and said first heat dissipation means; and a second plate disposed in heat transfer relationship between said second heat exchange coil and said second heat dissipation means.

8. Apparatus as recited in claim 7 wherein said circulation control means operatively associated with said coolant heat exchange means comprises:
a. first supply conduit means for directing the coolant fluid to be cooled to said coolant heat exchange means;
b. second supply conduit means for directing the coolant fluid to be cooled from the first conduit means directly to the inlet of the first heat exchange coil of said coolant heat exchange means;
c. third supply conduit means for directing the coolant fluid to be cooled from the first conduit means directly to the inlet of the second heat exchange coil of said coolant heat exchange means;
d. first discharge conduit means for directing the cooled coolant fluid from said coolant heat exchange means;
e. second discharge conduit means for directing the cooled coolant fluid from the outlet of the first heat exchange coil of said coolant heat exchange means to the first discharge conduit;
f. third discharge conduit means for directing the cooled coolant fluid from the outlet of the second heat exchange coil of said coolant heat exchange means to the first discharge conduit;
g. connector conduit means for directing cooled coolant from the outlet of the first heat exchange coil to the inlet of the second heat exchange coil of said coolant heat exchange means;
h. bypass conduit means for directing the coolant fluid to be fluid directly from the first supply conduit to the first discharge conduit whereby the coolant fluid passing through the bypass conduit bypasses both the first and the second heat exchange coils of said coolant heat exchange means; and
i. means for selectively directing the coolant fluid through said conduit means.

9. Apparatus as recited in claim 8 wherein said means for selectively directing the coolant fluid through said conduit means comprises:
a. first valve means operatively associated with the first, second and third supply conduit means for selectively directing the coolant fluid to be cooled from the first supply conduit means through the second supply conduit means exclusively or the third supply conduit means exclusively;
b. second valve means operatively associated with the second discharge conduit means and the connector conduit means for selectively directing the cooled coolant fluid discharged from the first heat exchange coil means through the second discharge conduit means exclusively or the connector conduit means exclusively;
c. third valve means operatively associated with the first supply conduit means and the bypass conduit means for selectively directing a portion of the coolant fluid to be cooled through the bypass conduit means; and
d. valve control means for selectively operating the first, second and third valve means.

10. A non-venting cooling apparatus for transferring heat from a coolant fluid to a surrounding environment to cool the coolant fluid from a first temperature at which the coolant fluid is received to a lower second temperature at which the coolant fluid is discharged, said apparatus comprising:
a. a first heat dissipation means for absorbing heat from the coolant fluid, said first heat dissipation means enclosing a first phase change material;
b. a second heat dissipation means for absorbing heat from the coolant fluid, said second heat dissipation means enclosing a second phase change material, the phase change temperature of the second phase change material being lower than the phase change temperature of the first phase change material;
c. coolant heat exchange means for passing the coolant in heat exchange relationship with said first and second heat dissipation means, said coolant heat exchange means having a first portion operatively associated in heat exchange relationship with said first heat dissipation means and a second portion operatively associated in heat exchange relationship with said second heat dissipation means;
d. heat pump means disposed between the second portion of said coolant heat exchange means and said second heat dissipation means for augmenting the transfer of heat between said coolant heat exchange means and said second heat dissipation means;
e. circulation control means operatively associated with said coolant heat exchange means for selectively directing the coolant fluid to pass through at least one of the first and second portions of said coolant heat exchange means; and f. radiator means operatively associated with said first and second heat dissipation means for transferring heat from said first and second phase changes materials to a surrounding environment.

11. Apparatus as recited in claim 10 wherein said heat pump comprises a plurality of thermoelectric modules.

12. Apparatus as recited in claim 11 wherein the first phase change material consists essentially of hexadecane paraffin.

13. Apparatus as recited in claim 12 wherein the second phase change material consists essentially of tetradecane paraffin.

14. Apparatus as recited in claim 11 wherein the phase change temperature of the first phase change material is generally lower than the value of said second temperature and the phase change temperature of the second phase change material is lower than the minimum value of said second temperature.

15. Apparatus as recited in claim 11 wherein the phase change temperature of the first phase change material is between about 55° to about 65° F. and the phase change temperature of the second phase change material is less than about 50° F.

16. Apparatus as recited in claim 15 wherein the phase change temperature of the second phase change material is between about 39° to about 48° F.

17. Apparatus as recited in claim 11 wherein said coolant heat exchange means for passing the coolant in heat exchange relationship with said first and second heat dissipation means comprises a first heat exchange coil having an inlet and an outlet and a flow conduit therebetween; a second heat exchange coil having an inlet and an outlet and a flow conduit therebetween; and a first plate disposed in heat transfer relationship between said first heat exchange coil and said first heat dissipation means; and a second plate disposed in heat transfer relationship between said second heat exchange coil and said second heat dissipation means.

18. Apparatus as recited in claim 17 wherein said circulation control means operatively associated with said coolant heat exchange means comprises:

a. first supply conduit means for directing the coolant fluid to be cooled to said coolant heat exchange means;

b. second supply conduit means for directing the coolant fluid to be cooled from the first conduit means directly to the inlet of the first heat exchange coil of said coolant heat exchange means;

c. third supply conduit means for directing the coolant fluid to be cooled from the first conduit means directly to the inlet of the second heat exchange coil of said coolant heat exchange means;

d. first discharge conduit means for directing the cooled coolant fluid from said coolant heat exchange means;

e. second discharge conduit means for directing the cooled coolant fluid from the outlet of the first heat exchange coil of said coolant heat exchange means to the first discharge conduit;

f. third discharge conduit means for directing the cooled coolant fluid from the outlet of the second heat exchange coil of said coolant heat exchange means to the first discharge conduit;

g. connector conduit means for directing cooled coolant from the outlet of the first heat exchange coil to the inlet of the second heat exchange coil of said coolant heat exchange means;

h. bypass conduit means for directing the coolant fluid to be fluid directly from the first supply conduit to the first discharge conduit whereby the coolant fluid passing through the bypass conduit bypasses both the first and the second heat exchange coils of said coolant heat exchange means; and i. means for selectively directing the coolant fluid through said conduit means.

19. Apparatus as recited in claim 18 wherein said means for selectively directing the coolant fluid through said conduit means comprises:

a. first valve means operatively associated with the first, second and third supply conduit means for selectively directing the coolant fluid to be cooled from the first supply conduit means through the second or third supply conduit means;

b. second valve means operatively associated with the second discharge conduit means and the connector conduit means for selectively directing the cooled coolant fluid discharged from the first heat exchange coil means through the second discharge conduit means or the connector conduit means;

c. third valve means operatively associated with the first supply conduit means and the bypass conduit means for selectively directing a portion of the coolant fluid to be cooled through the bypass conduit means; and d. valve control means for selectively operating the first, second and third valve means.

* * * * *